United States Patent
Nicholson

(10) Patent No.: US 8,236,375 B2
(45) Date of Patent: Aug. 7, 2012

(54) SELECTIVE DEPOSITION OF CARBON NANOTUBES ON OPTICAL FIBERS

(75) Inventor: Jeffrey Nicholson, Chatham, NJ (US)

(73) Assignee: OFS Fitel, LLC, Norcross, GA (US)

( * ) Notice: Subject to any disclaimer, the term of this patent is extended or adjusted under 35 U.S.C. 154(b) by 776 days.

(21) Appl. No.: 11/589,012

(22) Filed: Oct. 27, 2006

(65) Prior Publication Data

US 2010/0098113 A1 Apr. 22, 2010

(51) Int. Cl.
*B05D 5/06* (2006.01)

(52) U.S. Cl. ........... 427/163.2; 427/162; 427/581; 427/596; 427/498; 427/512; 427/901; 427/430.1; 427/585; 427/586; 977/742; 977/844; 977/892

(58) Field of Classification Search ........... 427/430.1, 427/162–169, 581, 596; 977/844, 892
See application file for complete search history.

(56) References Cited

U.S. PATENT DOCUMENTS

| | | | |
|---|---|---|---|
| 5,073,402 A * | 12/1991 | Henderson | 427/2.12 |
| 5,169,677 A * | 12/1992 | Sangyoji et al. | 427/581 |
| 5,326,531 A * | 7/1994 | Hahn et al. | 422/82.06 |
| 6,774,333 B2 * | 8/2004 | Hannah | 209/579 |
| 2002/0150368 A1* | 10/2002 | Imoto | 385/132 |
| 2004/0038251 A1* | 2/2004 | Smalley et al. | 435/6 |
| 2004/0223524 A1 | 11/2004 | Ohta | |
| 2006/0198399 A1* | 9/2006 | Jablonski et al. | 372/10 |

OTHER PUBLICATIONS

Plewa et al, Processing carbon nanotubes with holographic optical tweezers, Optic Express, vol. 12, No. 9, May 3, 2004, pp. 1978-1981.*
Yamashita et al, Saturable absorbers incorporating carbon nanotubes directly synthesized onto substrates and fibers and their application to mode-locked fiber lasers, Optics Letters, vol. 29, No. 14, Jul. 15, 2004, pp. 1581-1583.*
Taguchi et al, Single laser beam fiber optic trap, Optical and Quantum Electronics 33, 2001, pp. 99-106.*
Constable et al; Demonstration of a fiber-optical light-force trap; Optics Letters; vol. 18; No. 21; 1993; pp. 1867-1869.*
EPO Search Report in related co-pending EP application No. 07019970.8-2111, Jan. 2008.
Nicholson et al., "Optically driven depostion of single-walled carbon-nanotube saturable absorbers on optical fiber end faces" (see search report for citation), Jul. 23, 2007.
Kashiwaga et al., "novel cost effective carbon nantubes deposition technique using optical tweezer effect", (see search report for citation), Feb. 9, 2007.

* cited by examiner

*Primary Examiner* — Timothy Meeks
*Assistant Examiner* — Elizabeth Burkhart
(74) *Attorney, Agent, or Firm* — Law Offices of Peter V. D. Wilde

(57) ABSTRACT

The specification describes a method for selectively depositing carbon nanotubes on the end face of an optical fiber. The end face of the optical fiber is exposed to a dispersion of carbon nanotubes while light is propagated through the optical fiber. Carbon nanotubes deposit selectively on the light emitting core of the optical fiber.

9 Claims, 4 Drawing Sheets

FIG. 8
FIG. 9
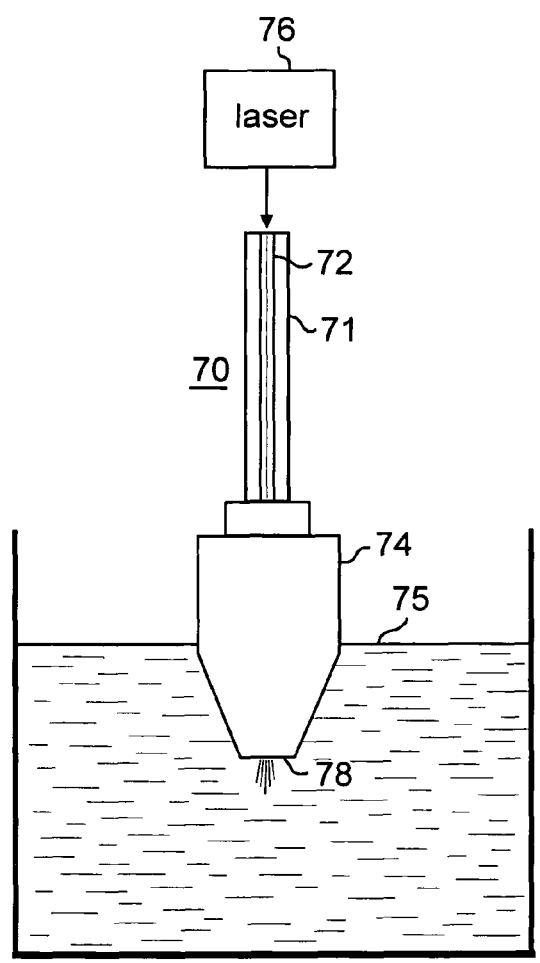
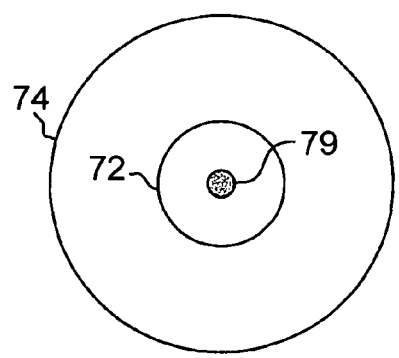

SELECTIVE DEPOSITION OF CARBON NANOTUBES ON OPTICAL FIBERS

FIELD OF THE INVENTION

The invention relates to optical fibers devices and more specifically to saturable absorbers useful, for example, for mode-locking lasers.

BACKGROUND OF THE INVENTION

Passive saturable absorbers have been extensively investigated for use in laser systems to extend the bit-rate and error-free transmission of periodically amplified optical transmission systems. At each amplification stage the optical signal is regenerated. Saturable absorber devices are simple and cost effective devices for passive optical regeneration. The noise suppression capability of such devices can attenuate the accumulated amplified spontaneous emission noise more than the higher-power signal component, thereby increasing the signal-to-noise ratio.

One common category of saturable absorbers considered for practical commercial applications are semiconductor devices. Semiconductor saturable absorber devices involve relatively complex and costly fabrication methods. This adds complexity and cost to the system. Moreover, they operate in a reflection mode. A saturable absorber device operating in a transmission mode is more desirable for many applications, notably for in-line elements in an optical fiber system. Optical saturable absorbers operating in transmission have been the focus of recent development efforts in this field.

New studies have shown that carbon nanotubes, typically single-walled carbon nanotubes (SWNTs), exhibit effective passive saturable absorption when placed in the optical path of a laser beam. See for example, S. Y. Set et al., Laser Mode-Locking and Q-Switching Using a New Saturable Absorber Material Based on Carbon Nanotubes, and Yamashita et al., Saturable absorbers incorporating carbon nanotubes directly synthesized onto substrates and fibers and their application to mode-locked fiber lasers. Both of these papers are incorporated herein by reference.

Techniques studied so far for preparing optical fiber-based SWNT saturable absorber devices are primarily SWNT growth methods wherein the surface of the optical fiber to be coated with carbon nanotubes is catalyzed with a metal catalyst, and carbon nanotubes are grown on the catalyzed surface. This method is essentially a catalyzed Chemical Vapor Deposition (CVD) method. While CVD and similar growth methods have proven useful, new techniques for simple, cost-effective, manufacture of optical fiber-based SWNT saturable absorber devices are in demand.

BRIEF STATEMENT OF THE INVENTION

It has been discovered that selective deposition of carbon nanotubes can be achieved using a pseudo-photolytic effect. Carbon nanotubes have been shown to selectively deposit onto surfaces that are illuminated. This phenomenon is directly applicable to optical fiber saturable absorber devices wherein the core of the optical fiber may be selectively coated with carbon nanotubes by transmitting light through the optical fiber while the coating process is performed. This in situ selective coating method is simple and versatile.

BRIEF DESCRIPTION OF THE DRAWING

FIGS. 8 and 9 show an alternative embodiment wherein the optical fiber is connectorized.

DETAILED DESCRIPTION

Figure 1:
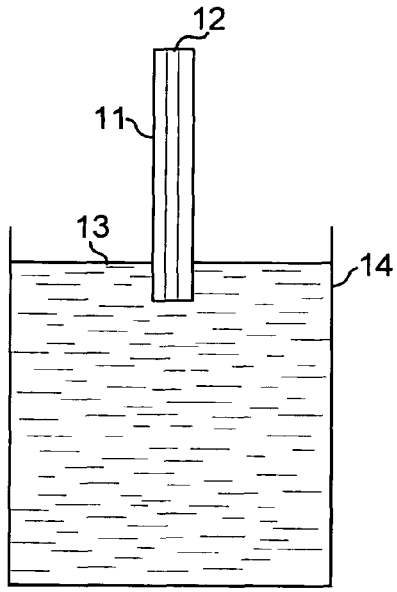
FIGS. 1-3 illustrate a prior art method for coating the end of an optical fiber with carbon nanotubes.
Figure 2:
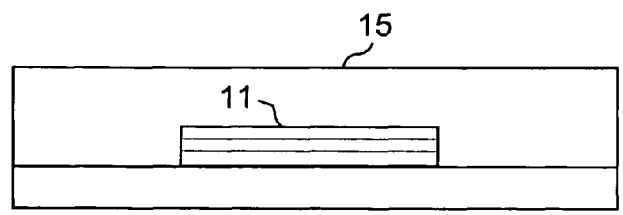
Figure 3:
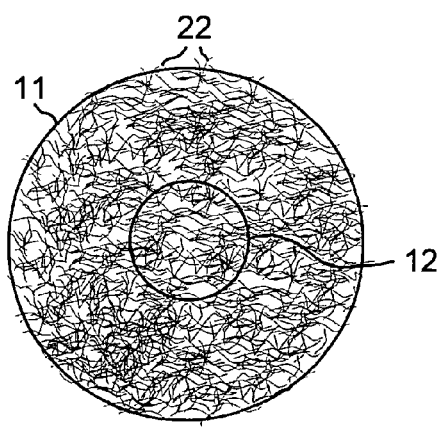

Deposition of carbon nanotubes on the end face of an optical fiber produces a saturable absorber element that is useful, e.g., for mode-locking lasers. A method for achieving this is represented in FIGS. 1-3. The figures in the drawing are not drawn to scale. In FIG. 1, optical fiber 11 is first coated with a metal catalyst by dipping the fiber into a container 14 carrying a metal salt solution 13. FIG. 2 shows the coated optical fiber disposed in an electric furnace 15 wherein the metal salt is oxidized to form a metal oxide. Subsequently, the furnace is evacuated and carbon nanotubes are grown on the catalyzed surface by CVD. The result of the method is illustrated in FIG. 3 wherein carbon nanotubes 22 are shown coating the end face of the optical fiber. FIGS. 1-3 also show a core 12 in the optical fiber 11. As is well known, optical fibers comprise a core that transmits the light signal when the optical fiber is in use. The significance of this feature will become apparent below.

An alternative coating procedure is a deposition technique where carbon nanotubes are first formed, then dispersed in a liquid solution. The liquid carrier for the dispersion may be any of a variety of liquids, for example, water, alcohols, ethers, ketones, etc. Volatile liquids may be preferred for ease in drying. The surface to be coated is dipped into the dispersion, or the dispersion applied to the surface to be coated, and the carrier liquid in the dispersion is dried, leaving behind a thin coating of carbon nanotubes on the surface. Multiple dipping or multiple coatings with the dispersion solution can form thicker layers of carbon nanotubes. In some circumstances, a single coating step may provide only a small number of deposited carbon nanotubes. Thus multiple coatings may be necessary to obtain a useful carbon nanotube layer.

Carbon nanotubes useful in the deposition methods may be prepared by a laser ablation method in which high energy laser pulses from a Nd:YAG laser are used to ablate a metal catalyzed carbon target placed in a quartz tube filled with 500 Torr of Argon gas. The quartz tube is heated in an electric furnace. With the aid of catalysts SWNTs with a diameter of approximately 1 nm may be grown. A variety of alternative techniques for preparing SWNTs are available. The method for preparing the SWNTs forms no part of the invention.

Figure 4:
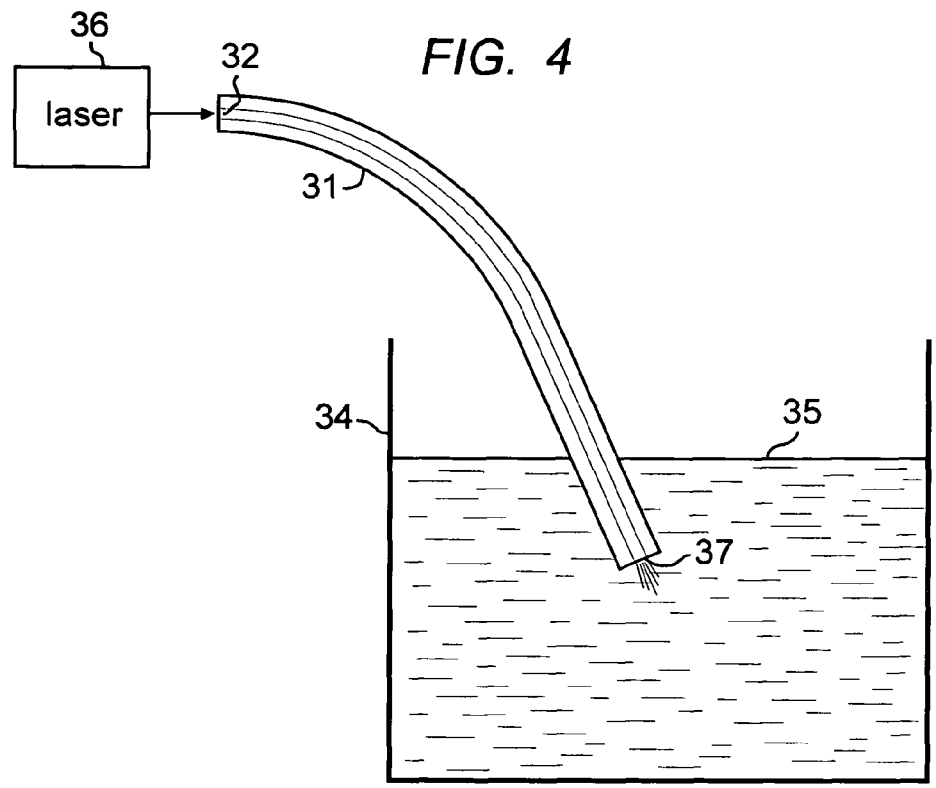
FIGS. 4 and 5 show selective deposition of carbon nanotubes on the end of an optical fiber using the method of the invention.
Figure 5:
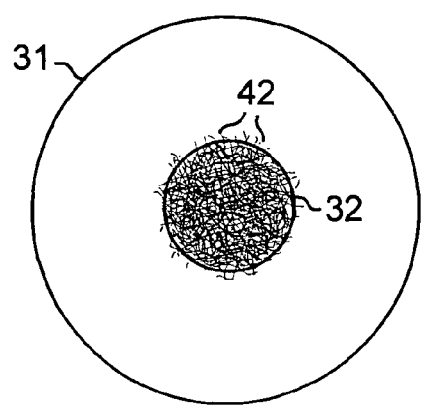

The selective deposition method of the invention is represented by FIGS. 4 and 5. In FIG. 4, optical fiber 31 is shown with the end of the fiber immersed in container 34. The container is filled with a carbon nanotubes dispersion 35. The optical fiber 31 comprises optical core 32 that is capable of guiding light in the optical fiber. The end face 37 of the optical fiber may be a cleaved face or a polished face. The optical fiber is shown in this figure without an optical fiber coating, i.e. with the usual plastic coating removed. The method can also be performed, in the manner described, on a coated optical fiber. In the latter case, the liquid chosen for the dispersion would be benign to the coating material.

According to the invention, light is carried by the optical fiber core 32 during the deposition step. In FIG. 4 light is shown entering the core from laser 36, and exiting the core at 37. It has been found that the illumination of the core portion of the end face of the optical fiber attracts carbon nanotubes, and the carbon nanotubes selectively deposit on the core surface. This is illustrated in FIG. 5 where carbon nanotubes 42 are shown selectively deposited on core 32 of optical fiber 31. Comparative tests show that without illumination, there is very limited deposition of carbon nanotubes on the end face of the optical fiber.

The dipping method may be performed by a variety of procedures. FIG. 4 shows the fiber immersed in the carbon nanotube dispersion while the light propagates through the fiber. The coating method may also be performed by dipping the fiber into the carbon nanotube dispersion, and withdrawing the fiber. This results in a bead of liquid dispersion on the end face of the optical fiber. Light may then be introduced through the optical fiber resulting in the selective deposition of carbon nanotubes on the core portion of the optical fiber. Thus "dipping" is intended to include dipping and removing as well as immersing.

To demonstrate the method of the invention, 0.001 grams of carbon nanotubes was dispersed in 12 cc of ethanol, and the mixture was ultrasonically dispersed. As a control experiment, the cleaved end of an optical fiber was dipped into the dispersion, and withdrawn. A bead of the liquid dispersion remained on the end face of the optical fiber. The liquid was then dried. On examination of the end face of the optical fiber few nanotubes were found affixed to the end face. The few nanotubes that did affix to the end face were randomly distributed.

The procedure just described was repeated, except that after dipping, with a bead of liquid dispersion attached to the end face of the optical fiber, 980 nm optical radiation was transmitted through the core of the optical fiber. The result is shown in FIG. 5, where an abundance of carbon nanotubes are selectively deposited on the core portion of the end face of the optical fiber. The cladding portion of the end face remains essentially uncoated.

Figure 6:
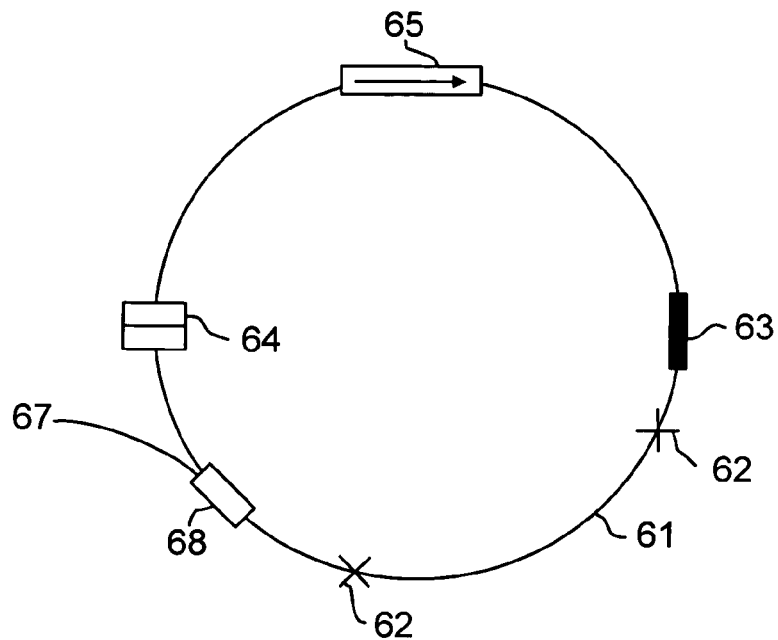
FIGS. 6 and 7 illustrate the application of an optical fiber selectively coated by the method of the invention for a ring laser.

The optical fiber with selectively deposited carbon nanotubes was incorporated in a ring laser setup to demonstrate its effectiveness as a saturable absorber. The ring laser setup is shown in FIG. 6, where the gain section is pumped by 980 nm pump 63 into the erbium doped fiber section 61. The gain section is spliced at splices 62 to isolator 65 and 70/30 splitter 68. The output exits the ring at pigtail 67. The saturable absorber element 64 comprises a FC/ACP connector mated to a second FC/ACP connector that has been coated with carbon nanotubes using the method previously described comprising the optical fiber just described between FC/APC connectors, is shown at 65.

Figure 7:
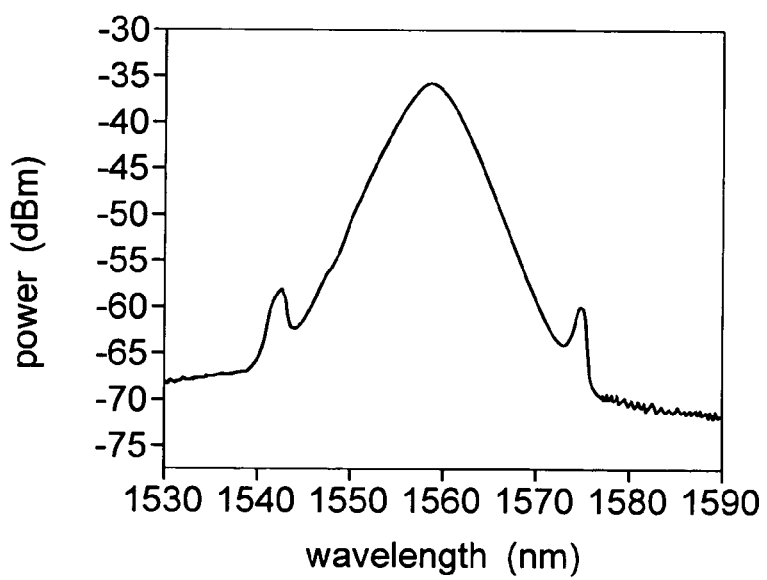

FIG. 7 shows an output spectrum taken from the ring laser of FIG. 6. The spectrum shows a mode-locked spectrum with a peak signal at approximately 1558 nm.

The combination of a laser and the saturable absorber just described constitutes a useful optical subassembly wherein the saturable absorber comprises an optical fiber with the core selectively coated with carbon nanotubes. In this optical subassembly, the saturable absorber may be connected directly to the laser, or may be connected to the laser through intermediate elements.

In an alternative embodiment, the optical fiber is terminated with a portion of a connector, for example the male portion of an FC connector. In this case, the end face of the optical fiber core encased in the connector is coated with carbon nanotubes. This is a convenient method for forming an in-line saturable absorber. This embodiment is presented in FIGS. 8 and 9. FIG. 8 shows an optical fiber 70, comprising glass fiber 72 and optical fiber coating 71, terminated in optical connector 74. Details of the connector are not relevant to the invention. The connector may be of any suitable type, e.g. FC, FC/APC. The end of the connector is dipped into a carbon nanotube dispersion 75. Light from laser 78 is propagated through the optical fiber, resulting in selective deposition of carbon nanotubes on end face 78. The end face of the connector is shown in FIG. 9. The connector 74 surrounds the end of the optical fiber 71. The core of the optical fiber is shown at 79, selectively coated with carbon nanotubes.

It should be evident to those skilled in the art that the dipping step for the method represented by FIG. 8 may be either of the dipping steps previously described, or any suitable alternative. It is only important to expose the end face of the article being coated to the liquid dispersion.

Optical fibers used to demonstrate the invention were silica based optical fibers. These typically comprise more than 90% silica, with suitable doping to form the light guide.

In the selective coating method of the invention, the spatial location of the coating material is determined by light propagating through the optical fiber. While the material deposited in the method described above comprises carbon nanotubes, other materials may be selectively applied to the illuminated region of an optical fiber in a similar manner.

Likewise, other elements may be selectively coated using the light mechanism specified. The light emitting face of a laser may be coated with nanotubes in the manner described. Light emitting diodes may also be selectively coated. In each case only that portion of the light emitting face of the element, the illuminated portion, is coated with carbon nanotubes. For purposes of defining the invention, the term light emitting element is intended to include a laser, a light emitting diode, and an optical fiber with light propagating through the optical fiber.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for selectively depositing carbon nanotubes onto an end face of an optical fiber comprising the steps of:
    immersing the end face of the optical fiber with a liquid wherein said liquid comprises, at least, a dispersion of carbon nanotubes;
    propagating light through the optical fiber so as to illuminate a first region of the end face of the optical fiber, wherein said illumination causes said carbon nanotubes to deposit onto a substantial portion of the illuminated first region.

2. The method of claim 1 wherein the first region of the end face of the optical fiber comprises a core.

3. The method of claim 1 wherein the carbon nanotubes comprise single-walled carbon nanotubes.

4. The method of claim 1 wherein the liquid is selected from the group consisting essentially of water, alcohols, ethers, and ketones.

5. The method of claim 1 wherein the light is laser light.

6. The method of claim 5 wherein the laser light has a wavelength of approximately 980 nm.

7. The method of claim 1 wherein the optical fiber encased in an optical fiber connector and an end face of the encased optical fiber is exposed to the liquid.

8. A method for selectively depositing carbon nanotubes onto an end face of a light emitting element, comprising the steps of:

immersing the end face of the light emitting element with a liquid wherein said liquid comprises, at least, a dispersion of carbon nanotubes;

propagating light through the light emitting element so as to illuminate only a first region of the end face of the light emitting element, wherein said illumination causes said carbon nanotubes to deposit onto a substantial portion of the illuminated first region.

9. The method of claim 8 wherein the light emitting element is selected from the group consisting of lasers, light-emitting diodes, and optical fibers propagating light.

* * * * *